US008256196B2

(12) United States Patent
Burns

(10) Patent No.: US 8,256,196 B2
(45) Date of Patent: Sep. 4, 2012

(54) EQUINE TONGUE TIE

(76) Inventor: David Lawrence Burns, Summerfield, FL (US)

( * ) Notice: Subject to any disclaimer, the term of this patent is extended or adjusted under 35 U.S.C. 154(b) by 106 days.

(21) Appl. No.: 12/862,947

(22) Filed: Aug. 25, 2010

(65) Prior Publication Data

US 2011/0047943 A1 Mar. 3, 2011

Related U.S. Application Data

(60) Provisional application No. 61/236,671, filed on Aug. 25, 2009.

(51) Int. Cl.
*B68B 1/00* (2006.01)
*A01K 15/04* (2006.01)

(52) U.S. Cl. ............... 54/1; 119/821; 128/860; 224/251

(58) Field of Classification Search .................. 119/821, 119/831, 833; 128/860; 604/77; 294/147, 294/150; 24/300, 301; 224/250, 251, 917; 54/1, 9, 24; 248/300, 75, 205.2; *B68B 1/00, B68B 1/02; A01K 15/04; A01C 5/14*
See application file for complete search history.

(56) References Cited

U.S. PATENT DOCUMENTS

| | | | | |
|---|---|---|---|---|
| 1,706,461 | A * | 3/1929 | Oathout | 112/415 |
| 2,844,142 | A * | 7/1958 | Gibbons | 600/240 |
| 3,776,197 | A * | 12/1973 | Hughes | 119/833 |
| 3,947,927 | A * | 4/1976 | Rosenthal | 24/306 |
| 5,147,261 | A * | 9/1992 | Smith et al. | 482/106 |
| 5,197,760 | A * | 3/1993 | Schollenberger | 280/814 |
| 5,205,803 | A * | 4/1993 | Zemitis | 482/121 |
| 5,873,328 | A * | 2/1999 | Campbell | 119/798 |
| 6,138,882 | A * | 10/2000 | Buettner | 224/250 |
| 6,375,052 | B2 * | 4/2002 | Keton | 224/222 |
| 7,587,796 | B1 * | 9/2009 | Schultz | 24/306 |
| 2005/0051583 | A1 * | 3/2005 | Herzog | 224/221 |

* cited by examiner

*Primary Examiner* — Rob Swiatek
*Assistant Examiner* — Thien Thanh Pham
(74) *Attorney, Agent, or Firm* — David L King

(57) ABSTRACT

An equine tongue tie has a small elastic tongue loop 14 and a large elastic jaw loop 12. The two loops 12, 14 are stitched or otherwise joined at a location 18 across the width of the loops. The two loops 12, 14 can be made from a single strap 2 of elastomeric material wherein the ends are preferably folded over prior to stitching or otherwise affixing so as to form four layers of the elastomeric material at the location 18 wherein the tongue loop 14 and jaw loop 12 are joined. Alternatively, each loop can be made from a separate strap, each tongue loop 14 and jaw loop 12 having its ends overlapped and sewn together to form a separate loop and these two separate loops 12, 14 being sewn together where the sewn ends overlap creating four layers of material at the location 18 where the loops are joined.

19 Claims, 6 Drawing Sheets

EQUINE TONGUE TIE

RELATED APPLICATIONS

This invention relates and claims priority to U.S. provisional patent application Ser. No. 61/236,671 entitled "Comfy-Tie, A.K.A. Equine Tongue Tie" filed Aug. 25, 2009.

TECHNICAL FIELD

This application relates to a device to hold a horse's tongue down, preventing the tongue from obstructing the animal's airway as it trains or races.

BACKGROUND OF THE INVENTION

Horses, when running, can have their tongues lift towards the roof of their mouth obstructing the airway and dorsal displacement of the soft palate. This soft palate acts like a flapper valve blocking the air flow to the lungs. This causes the horse to run slower and in the case of race horses can be a serious problem.

One way to solve the problem has been to surgically stitch the soft palate to hold it down. This procedure is costly and generally not that successful in that it is an unnatural solution that causes discomfort for the animal.

Temporary solutions have been to tie a strap about the tongue and lower jaw to hold the tongue down. This has resulted in being tied too tight causing blood flow to the tongue to be restricted causing the tongue to turn blue or alternatively being tied too loose causing the tongue tie down to be useless.

The tongue itself is a large, muscular organ containing blood vessels, nerves and three distinct muscles: the genioglossus, hyoglossus and styloglossus. These muscles control the movement of the tongue, which forms a key component in both the passage of feed in the mouth and in the airway of the horse. Horses that display unusual tongue positioning such as poking their tongue out should always have a thorough examination by a veterinarian, with close attention being paid to the fit of any tack used. It should be remembered that one of the main areas of contact of most bits is the tongue and in response to poorly fitted or inappropriate tack the horse may move its tongue to a more comfortable position. This may be perceived as a problem for riders but devices, such as tongue ties, should be used only with great care. A tongue tie restricts movement of the tongue and is most commonly used in racing to prevent restriction of the airway during exercise. Incorrect use of these devices can lead to severe injury and scarring of the tongue. When a tongue tie is used correctly the tongue is pressed flat across the mouth during exercise, and is one of the key factors in preventing dorsal displacement of the soft palate (DDSP), a condition that affects some horses and can lead to problems with breathing during exercise. Dr. Shannon Lee DVM recommends the use of tongue ties and nosebands for horses experiencing this problem. These methods function to keep the tongue pulled forward (tongue tie) and the mouth closed (nosebands). The tongue is pulled forward and tied in place to the lower jaw of the horse using a soft cotton, nylon or leather strap which is tied together. Because of its attachments, pulling the tongue forward also bring the epiglottis forward. This creates a more secure positioning of the epiglottis above the soft palate. Using a noseband, drop noseband or figure eight, which is pulled tightly, will keep the horse from opening its mouth and pulling its tongue further back into the mouth, a movement that will sometimes exasperate a dorsal displacement of the soft palate if done properly with care.

The present invention replaces the prior art straps used for tie downs with a unique device that eliminates the potential for misapplication of a tongue tie down. More importantly, the device of the present invention is comfortable and more easily secured to the animal allowing it to be used and quickly removed after each exercise or race.

SUMMARY OF THE INVENTION

An equine tongue tie has a small elastic tongue loop and a large elastic jaw loop. The two loops are stitched or otherwise joined at a location across the width of the loops. The two loops can be made from a single strap of elastomeric material wherein the ends are preferably folded over prior to stitching or otherwise affixed so as to form at least four layers of the elastomeric material at the location wherein the tongue loop and jaw loop are joined. Alternatively, each loop can be made from a separate strap, each tongue loop and jaw loop having its ends overlapped and sewn together to form a separate loop and these two separate loops being sewn together where the sewn ends overlap creating four layers of material at the location where the loops are joined.

The loops should have a strap width of at least 0.75 inch, preferably 1.0 inch or more. The diameter of the small tongue loop is preferably about 1.25 inches, the diameter of the larger jaw loop is preferably about 2.125 inches. When made from a single strap, the strap length is about 13 inches with ends overlapped about 0.25 inch or more. When made as separate straps, the small tongue loop strap is about 4.0 to 6.0 inches in length preferably about 5.0 inches long and the larger jaw loop strap is about 7.0 to 9.0 inches in length preferably about 8.0 inches in length. In both cases, the ends of the strap overlap at least 0.25 inch. The two loops can be joined at the overlapping ends to form a figure "8" and therefore, the large jaw loop can be turned inside out to encircle the smaller tongue loop. Alternatively, the loop can be sewn together this way, if so desired. Preferably, the elastic material from which the loops are made is braided elastic material having an outer covering of polyester, rayon, nylon or cotton covering rubber, neoprene or other elastomeric material and at the area wherein the ends are sewn and the loops sewn together the material has a loss of stretch creating a location of low stretch and higher stiffness. The device can be made of black colored material or any other color, preferably in colors that match those worn by the jockey in the case of race horses.

BRIEF DESCRIPTION OF THE DRAWINGS

FIG. 6A being an exploded view, FIG. 6B being an assembled view.

DETAILED DESCRIPTION OF THE INVENTION

Figure 1:
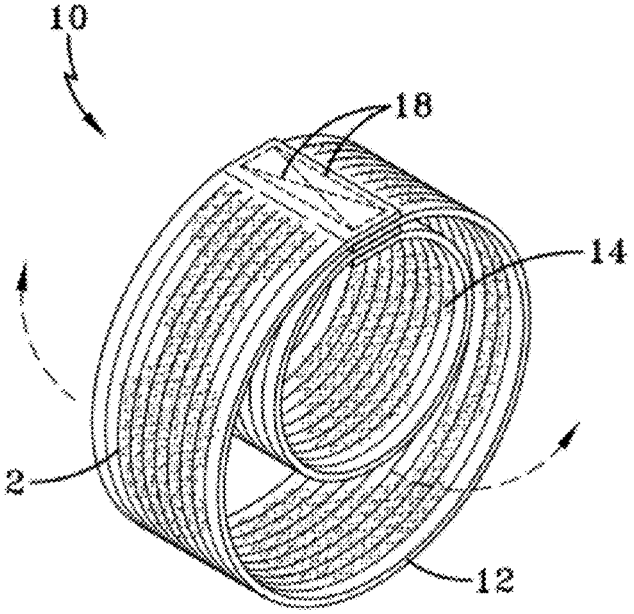
FIG. 1 is a perspective view of the invention.

With reference to FIG. 1, a perspective view of the device made according to the present invention is illustrated. The device is a unique type of tongue tie for horses, more particularly horses that are exercised or raced wherein there is a need to maintain the tongue in a depressed condition within the mouth to prevent the tongue from blocking or occluding the airway of the animal. As shown, the tongue tie 10 is made of an inner loop, this inner loop 14 is a small loop used to hold the tongue, hereinafter the loop 14 will be referred to as the tongue loop. The outer loop 12 is shown which is a loop of material that wraps over the jaw of the animal helping hold the tongue against the lower jaw and keeping it in this depressed fashion so that it can maintain that position during racing or exercising such that the airways are open and not blocked. As shown, this equine tongue tie 10 is made of braided elastic material. As illustrated, the material is in a strap configuration having a width of approximately 1.0 inch, small widths of 0.75 inch or greater could be used, however, it is important that the width be sufficiently large to provide adequate comfort to the horse while wearing the device. The wider the width, the more comfortable, and the one inch width has been found to be extremely comfortable for the animal. As illustrated the braided elastic material is a material that has a rubber or stretchable inner core about which a synthetic or otherwise natural product such as cotton can be wrapped about a rubber core covering material so that it has good stretch along the strap's length and reasonably no stretch along its width. With reference to the outer covering, it is important to note that the covering material could be made of polyester, nylon, rayon or any particular material if so desired and the inner material can be rubber, neoprene or any other elastomeric material. What makes the braided elastic material convenient for use is that it is sufficiently inexpensive, while providing good stretchability, it is far superior to simply rubber bands in that the product is very difficult to break, has good strength, has very few problems associated with tearing or cutting or otherwise coming loose while in the horses mouth.

Figure 2:
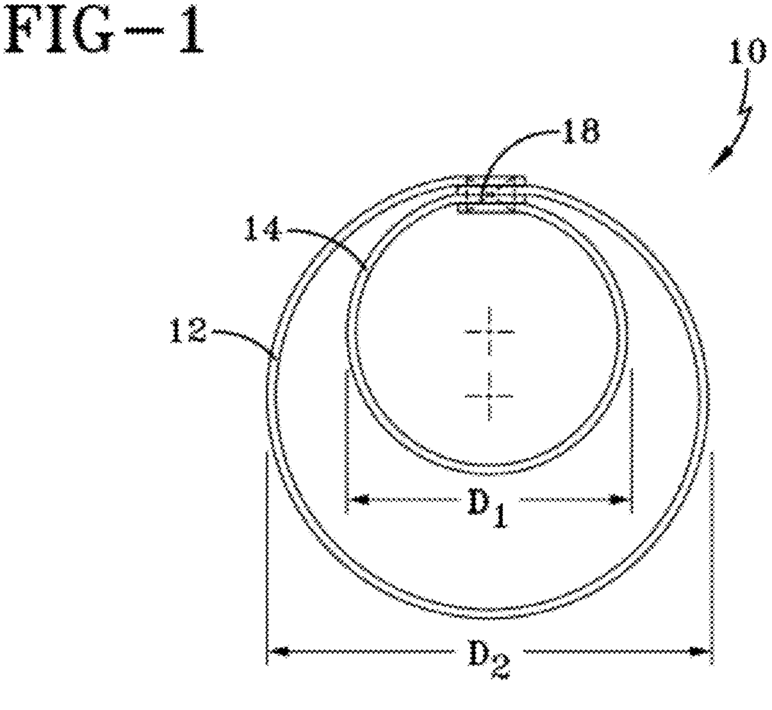
FIG. 2 is a front plan view of the invention.

With reference to FIG. 2, a plan view of the tongue tie device 10 is shown wherein the jaw loop 12 has a diameter $D_2$ and the tongue loop 14 has a diameter $D_1$. It has been determined through a variety of testing that 98 percent of horses currently can accommodate a size wherein the diameter $D_1$ is about 1.25 inches on the tongue loop 14 and the diameter $D_2$ is approximately 2.125 inches on the jaw loop 12. To make this prior art FIG. 2, it has been determined that individual straps can be used wherein the tongue loop 14 uses a strap approximately 5.0 inches long, however, this can vary by plus or minus 0.5 inch. This loop can then be formed into a single loop by overlapping the ends by approximately 0.25 inch or more and stitching the ends together to form a circle or loop. Once the tongue loop 14 is stitched, the outer jaw loop 12 can be stitched. In this case it has been determined that an 8.0 inch loop of braided elastic material can be used and that material can be made such that it also has a 0.25 inch overlap at the ends and should be stitched, sewn or otherwise affixed at the ends and this overall length can vary by approximately 1.0 inch.

Figure 5A:
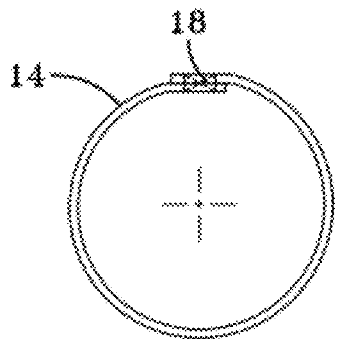
FIG. 5A is a plan view of a small tongue loop made as a single piece.
Figure 5B:
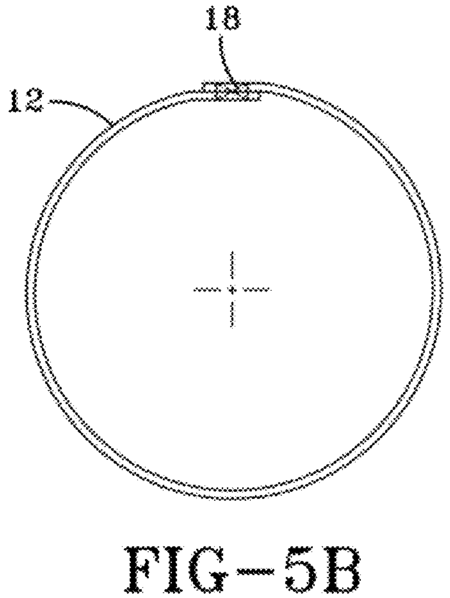
FIG. 5B is a plan view of a large jaw loop made as a separate piece.
Figure 5C:
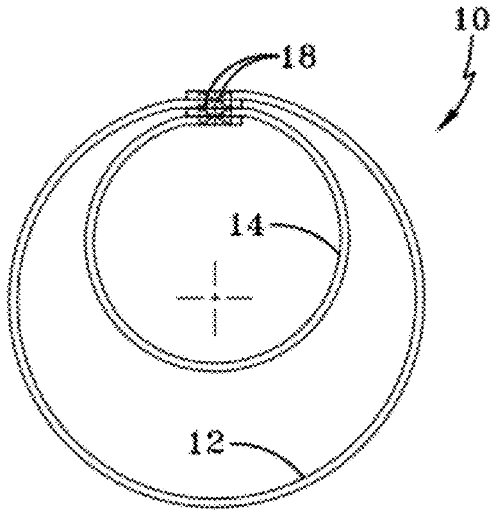
FIG. 5C is a plan view of the two pieces joined at a location wherein the respective ends are joined together.

In the preferred embodiment, it was determined when using a two piece strap 2, it was desirable to have the loops made 5.0 and 8.0 inches. The two strap configuration is illustrated in FIGS. 5A showing the tongue loop 14, 5B showing the jaw loop 12 and FIG. 5C showing the combination of the two loops 12, 14. It is particularly useful to recognize that when the two loops are made from separate straps as so described, it is important that the joined ends that are sewn together be aligned and those aligned ends should be stitched together. When doing this it has been determined that the 0.25 inch overlaps of the two ends are such that in combination with the joined stitching creates a non-stretch zone 18 that will be directly over the top of the tongue of the animal when inserted into the horse's mouth.

Figure 3:
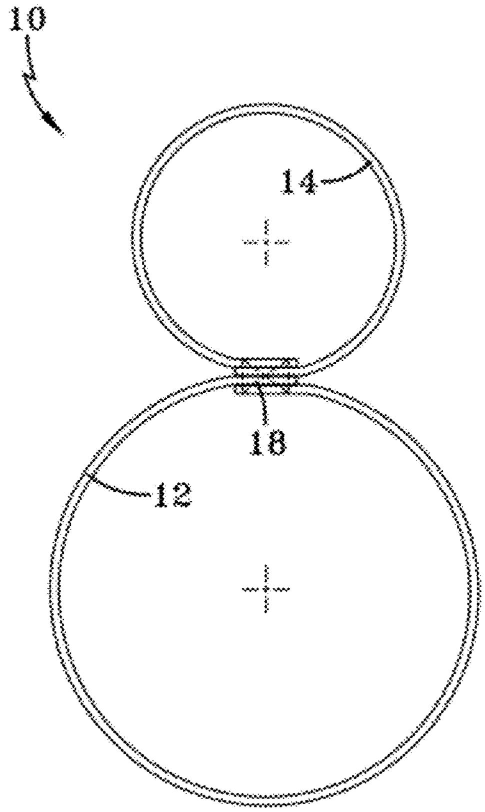
FIG. 3 is a front plan view of the invention with the device formed as a figure "8".
Figure 3A:
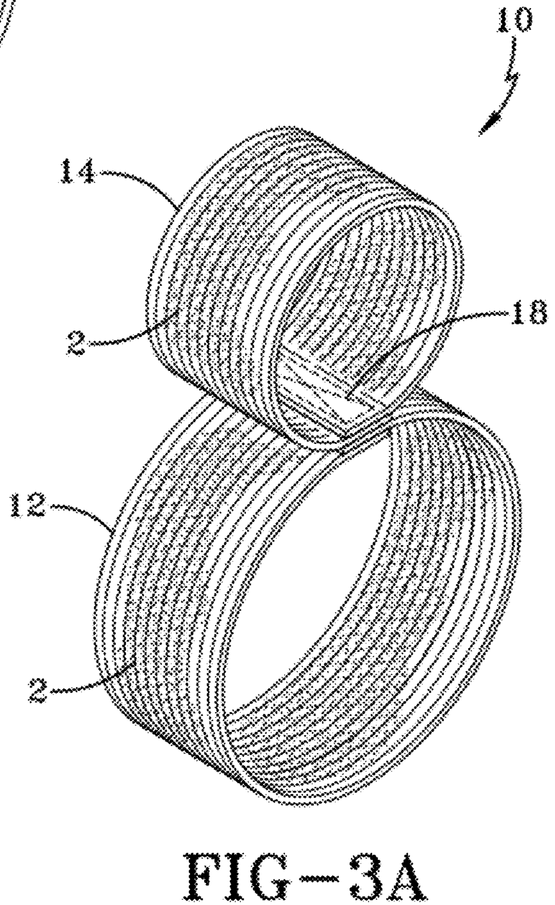
FIG. 3A is a perspective view of FIG. 3.

When assembling the two components, it has been determined that they can be stitched together as shown in FIG. 5C or alternatively in somewhat easier to manufacture it has been determined as shown in FIG. 3, the two components can be assembled such that the overlapped ends are aligned making a figure "8" configuration wherein the two ends are then joined together by stitching or otherwise affixing them at this location 18. Once this assembly has been made, the outer jaw loop 12 can be turned inside out which will force the inner loop 14 to fold inwardly as shown in FIG. 1.

In an alternative embodiment, it was determined that it would be possible to make this tongue tie 10 in an alternative fashion wherein in one strap 2 of material is used. In such a case, a 13.0 inch length of strap of material could be used wherein one or both ends 12A and 14A could be overlapped and stitched together and the loops could be wrapped and formed such that the smaller tongue loop 14 and the outer jaw loop 12 could be assembled with a non-stretch zone 18 as shown in FIG. 4B. In this embodiment, a single strap produces a similar result to that of the embodiment shown in FIGS. 1, 5A, 5B and 5C in that the stitching due to the overlapping can create a non-stretch zone 18 of 5 layers thickness. This has been found desirable, however, it is important to note when constructing the alternative embodiment in FIG. 4A only one end needs to be overlapped and that overlap end does not need to occur until the entire loop has been configured as shown in FIG. 4B at which point either the internal end or the external or outermost end can be folded over in such a fashion if only one end is folded over, the non-stretch zone 18 will only have a thickness of 4 layers. These alternative embodiments would enable the device to have a stiffening zone 18 substantially greater than if the two loops were simply joined at any non end location and thus has less stretch than if the braided material were simply joined together at any non end location. The advantage of having a non-stretch zone 18 directly over the tongue is that the tongue tie 10 tends to center itself directly over the tongue in such a fashion that the non-stretch zone 18 helps hold the tongue down and greatly facilitates the performance of the device.

Figure 4A:
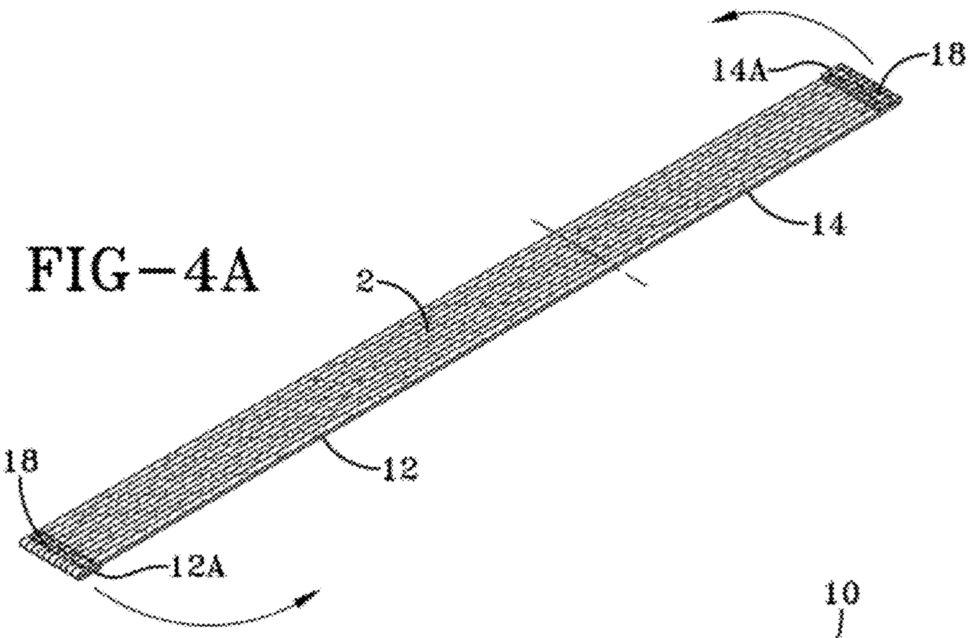
FIG. 4A is the device of the present invention made from a single piece strap with folded ends sewn together forming a figure "8".
Figure 4B:
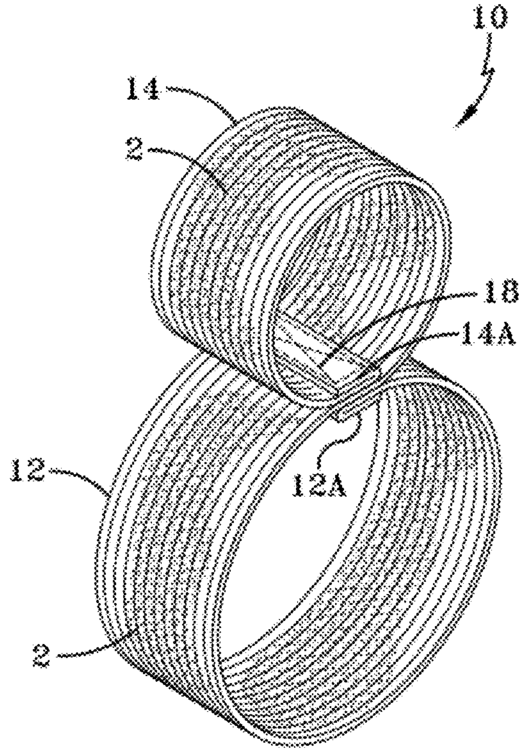
FIG. 4B is a perspective view the assembled strap of FIG. 4A.
Figure 6A:
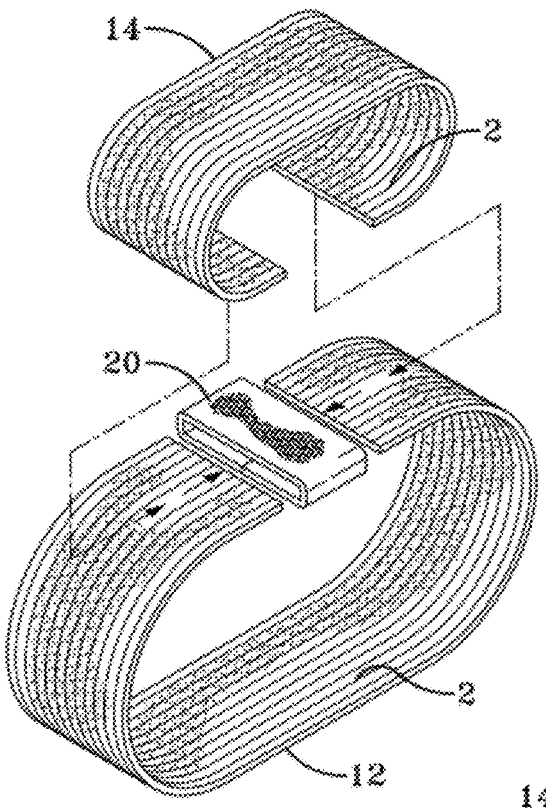
FIGS. 6A and 6B are an alternative embodiment of the device using a non-stretch coupling for joining the loops.
Figure 6B:
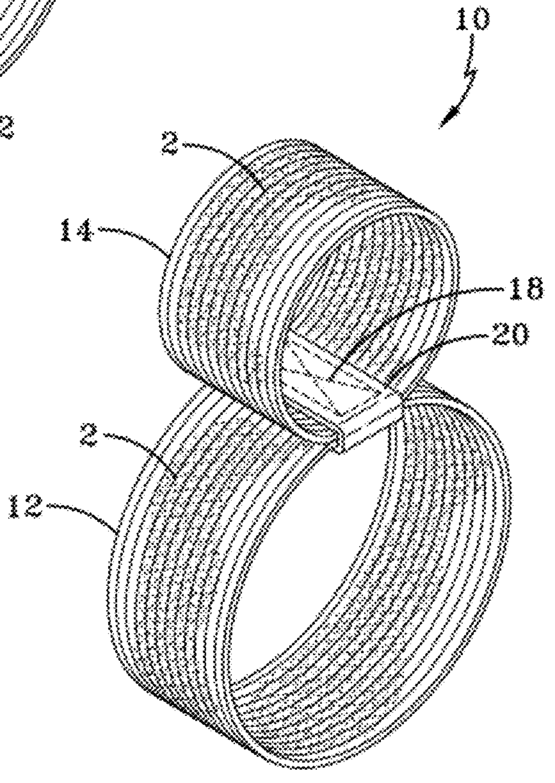

With reference to FIGS. 6A and 6B, the third alternative embodiment is shown wherein the tongue tie 10 can be made from three separate components, as shown in FIG. 4A, however wherein the ends are slipped into a tubular coupling or woven sleeve 20, the coupling 20 can be a woven synthetic material that is non-stretchable or plastic material or any other material and it is possible to then either weave, heat seal or alternatively stitch the ends of the braided material directly together at the coupling 20. In this fashion, the loops 12, 14 can be made as two separate strap components or one long strap component forming both the small tongue loop 14 and the outer jaw loop 12 as configured with a non-stretch zone 18 being at the coupling 20. While this alternative embodiment is not preferred, as it adds an additional component, it is provided to show that the concept can be made in an alternative construction which is considered within the scope of the present invention.

Figure 7:
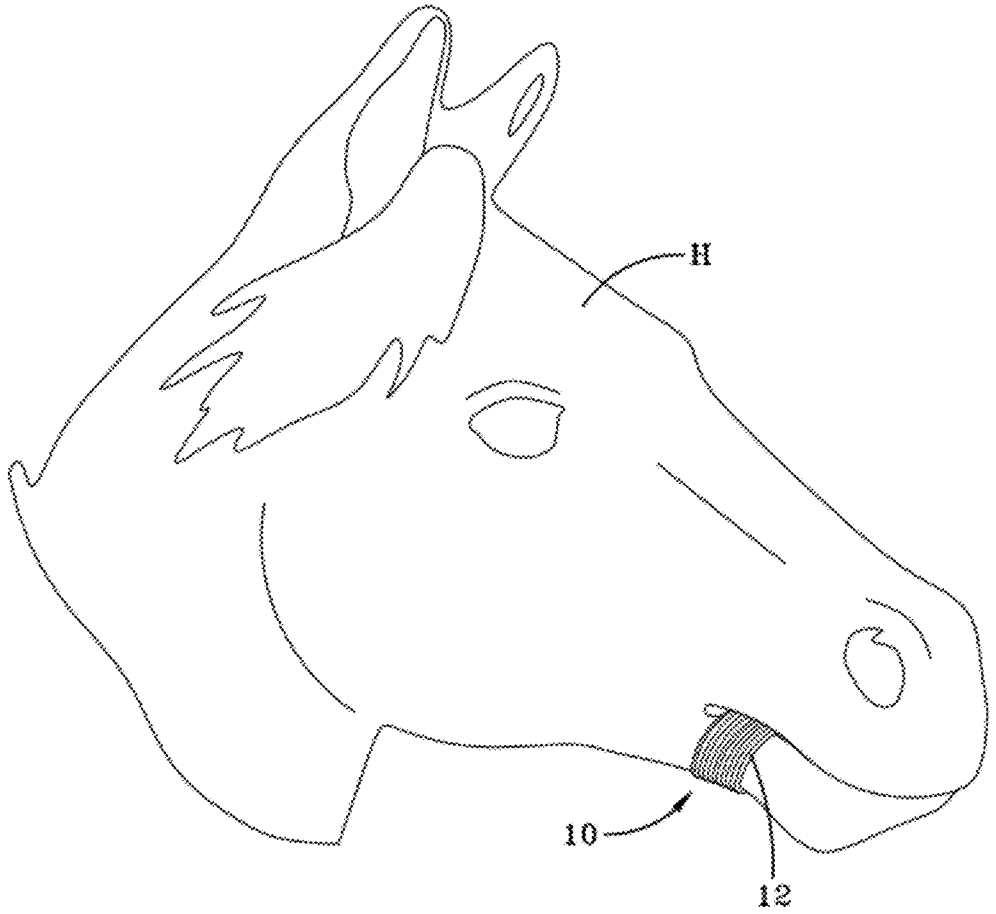
FIG. 7 shows a horses head with the equine tongue tie of the present invention inserted into the mouth.

With reference to FIG. 7, the equine tongue tie is shown properly installed on a horse H with the jaw loop 12 clearly shown over the lower jaw. Not shown is the tongue pulled through the small tongue loop 14 and encircled by the loop 12 with the non-stretch stitched portion 18 directly over the tongue. As can be easily appreciated, the tongue tie 10 fits comfortably in the animal's mouth without adding stress.

The equine tongue tie device 10 made according to the present invention can be provided in black color such that stains or other moisture from the horse's mouth is not easily observable, alternatively, the equine tongue tie device 10 can be provided in any color, in particular for race horses it can be provided in the colors of the jockey or the horses colors that is racing on a particular day. Therefore the device can be color coordinated to the jockey's colors.

It is important to note, while particular dimensions have been provided and that the best mode of practicing the invention in terms of using two loops of 5.0 and 8.0 inch elastic braided material having a 1.0 inch width, these dimensions can be varied or altered slightly such that the width can be slightly narrowed while the diameters can be reduced such that the holding force can be maintained at a relatively constant level, however, for maximum comfort it has been determined that a 1.0 inch wide braided strap is most comfortable for the horse, slightly larger components could be used in terms of width, however, it is important to note that any variations within the size are considered within the scope of this present invention. An alternative configuration must have an inner loop for holding a tongue that is stretchable and an outer loop for holding the jaw that is stretchable wherein the two loops are conjoined at a single location and at that location a non-stretchable zone is created to help depress the tongue. This creates a rather unique structure that has heretofore been unknown in the prior art. It is important to understand that the device as shown could have been configured as a figure "0" of a single loop wherein a twisting of a loop would create the "8" configuration and the fold over could create a similar device, however, under such a structure, such a loop would have a twist resting at the top of the tongue and also not be permanently affixed wherein it could slide along the twist, as such it is inferior to the tongue tie 10 as illustrated. Accordingly, such a large rubber band made with this type of figure "8" configuration would have the disadvantage that there would be no non-stretch zone, however would have a twist zone and this twist zone would be movable along the band, in such a fashion, one could not guarantee its location relative to the horses tongue. Such a product would be clearly inferior to the present design, which provides for an easy way of inserting the tongue into the small loop 14 while encircling the larger loop 12 over the lower jaw of the horse's mouth.

Braided elastic as used in the strap 2 is manufactured using a composition of materials such as polyester and rubber, is available in many colors and widths. Braided elastic is often used in waistbands, sleeves, necklines and leg bands. This kind of elastic is also used in casing. It becomes narrower and when sewn through, the needle pierces the rubber causing a loss of stretch and recovery. It is this very phenomenon that the present invention utilizes so that it can create a non-stretch zone or location 18 by stitching or weaving through the braided elastic material so that a non-stretch zone 18 is created. This non-stretch zone 18 is stiff and strong in that it is created at a location 18 where four layers of material are provided making it substantially stiffer and stronger than the single layer in each individual loop. These types of braided elastic material are made from and synthetic or combination rubbers. The braided elastic is fabricated to be shrink resistant and to stay unaffected by chlorine and salt water. What makes the product even more attractive to owners is that it is clearly washable and stains can be easily removed. It is important to note, however, that the product has a limited life in that its maximum tongue holding capability is good for several uses, however, over a period of time and extended use, the material can stretch and it is recommended it be replaced periodically to achieve maximum performance results for the animal during its racing and training.

In order to place the equine tongue tie 10 on a horse, the trainer will follow the method of placing two fingers inside the small loop 14; pulling the horses tongue through the small loop 14; sliding the large loop 12 under the jaw; sliding the small loop 14 well back onto the tongue; and repositioning the large loop 12 under the jaw. For best results, this equine tongue tie 10 recommends the use of a noseband, drop noseband, or a figure 8 in addition to help keep the horse's mouth closed. Using a noseband, drop noseband or figure 8 which is adjusted correctly and pulled tightly will keep the horse from opening its mouth and pulling and pulling its tongue further back, a movement that will sometimes exacerbate a dorsal displacement of the soft palate.

The above described invention is the only tongue tie specifically designed to prevent DDSP that is comfortable for the horse. The equine tongue tie 10 according to the present invention secures the tongue in a natural physiological position for the horse. Its elasticity fits 98 percent of horses based on the sizes as described herein. The equine tongue tie 10 prevents caudal retraction while maintaining a secure fit and unsurpassed comfort. The reinforced, double stitched top seam holds the tongue flat to prevent billowing and provides a point of reference for correct tie application.

An extremely important aspect of the present invention unlike any other tongue tie is that the horses respond favorably to its use. The tongue tie 10 is so comfortable and so easy to install that the horse hardly notices that it is there and that the horse does not provide the normal adverse reaction, get tense or aggravated due to the application of a tongue tie. This equine tongue tie device 10 as described above fits on comfortably, is easy to mount into the horses mouth and provides almost no discomfort in such a way that the horse is relaxed and more comfortable using this device and will perform to its potential without the occurrence of DDSP or any complications that hinder its performance and at the same time providing a horse with a device that is so comfortable the horse hardly notices that it is there.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

The invention claimed is:

1. An equine tongue tie made from a single strap of elastic material comprising:

a small elastic tongue loop;

a large elastic jaw loop; and wherein the small elastic tongue loop is stitched to the large elastic jaw loop at an end location of each loop across the width of the two loops joining the two loops forming a non-stretch zone adapted to be positioned over a tongue in use, wherein the two loops are sewn together in a figure "8" shape having the large elastic jaw loop inside out so the two loops are attached and tangent to each other where joined together.

2. The equine tongue tie of claim 1 wherein the ends of the strap are folded and stitched so as to form four layers of the elastic material at the location wherein the small elastic tongue loop and the large elastic jaw loop are stitched across the width of the strap.

3. The equine tongue tie of claim 1 wherein each loop has a strap width of at least 0.75 inch.

4. The equine tongue tie of claim 3 wherein each loop has a width of 1.0 inch.

5. The equine tongue tie of claim 1 wherein the loops are black.

6. The equine tongue tie of claim 1 wherein the loops are made in colors to match the jockey's colors.

7. The equine tongue tie of claim 1 wherein the loops are made of braided elastic material.

8. An equine tongue tie comprising:

a small elastic tongue loop;

a large elastic jaw loop; and wherein the small elastic tongue loop is stitched to the large elastic jaw loop at an end location of each loop across the width of the two loops joining the two loops forming a non-stretch zone adapted to be positioned over a tongue in use, wherein the small elastic tongue loop is made from a strap of elastic material having the ends of the strap overlapped and stitched together forming the loop; and the large elastic jaw loop is made from a separate strap of elastomeric material having the ends of the strap overlapped and stitched or otherwise affixed, the two separate loops being stitched at the overlap creating four layers of material at the location wherein the loops are joined.

9. The equine tongue tie of claim 8 wherein the two loops are stitched to form a figure "8" shape.

10. The equine tongue tie of claim 9 wherein the small elastic tongue loop has a diameter of 1.25 inches.

11. The equine tongue tie of claim 10 wherein the large elastic jaw loop has a diameter of 2.125 inches.

12. The equine tongue tie of claim 8 wherein the small elastic tongue loop is made from a 5.0 inch plus or minus 0.5 inch long strap.

13. The equine tongue tie of claim 8 wherein the large elastic jaw loop is made from one 8.0 inch plus or minus 1.0 inch long strap.

14. The equine tongue tie of claim 13 wherein the ends are overlapped at least 0.25 inch of both the small elastic tongue and the large elastic jaw loops.

15. The equine tongue tie of claim 8 wherein the two loops are joined to form one said large elastic jaw loop encircling one said small elastic tongue loop, and joined together at a location having four layers of material.

16. The equine tongue tie of claim 8 wherein the loops are made of braided elastic material.

17. The equine tongue tie of claim 16 wherein the braided elastic has an outer covering of polyester, nylon or cotton covering rubber, neoprene or other elastomeric material.

18. The equine tongue tie of claim 16 wherein the braided elastic material is stretchable but has a loss of stretch where sewn creating a location of high stiffness and low stretch.

19. The method of placing an equine tongue tie on a horse, the tongue tie having a small elastic tongue loop and a large elastic jaw loop comprising the steps of:

placing two fingers inside the small elastic tongue loop;

pulling the horses tongue through the small elastic tongue loop;

sliding the large elastic jaw loop over the lower jaw;

sliding the small elastic tongue loop well back onto the tongue; and repositioning the large elastic loop under the lower jaw;

wherein the small elastic tongue loop is stitched to the large elastic jaw loop at an end location of each loop across the width of the two loops joining the two loops forming a non-stretch zone; and positioning the location where stitched forming a non-stretch zone over the tongue.

* * * * *